(12) United States Patent
Bingol et al.

(10) Patent No.: US 10,015,228 B2
(45) Date of Patent: Jul. 3, 2018

(54) REMOTE DESKTOP PROTOCOL CLIENT FOR A STANDARDS-BASED WEB BROWSER

(71) Applicant: Dell Products L.P., Round Rock, TX (US)

(72) Inventors: Evren Bingol, San Francisco, CA (US); Curtis J. Schwebke, Los Gatos, CA (US)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 14/925,582

(22) Filed: Oct. 28, 2015

(65) Prior Publication Data

US 2017/0126775 A1    May 4, 2017

(51) Int. Cl.
*G06F 15/16* (2006.01)
*H04L 29/08* (2006.01)
*H04L 29/06* (2006.01)

(52) U.S. Cl.
CPC ............ *H04L 67/025* (2013.01); *H04L 67/42* (2013.01)

(58) Field of Classification Search
USPC ................ 709/219, 246, 236, 201, 202, 203
See application file for complete search history.

(56) References Cited

U.S. PATENT DOCUMENTS

| | | | |
|---|---|---|---|
| 6,873,625 B1 | 3/2005 | Yoo |
| 7,839,860 B2 | 11/2010 | Kobayashi |
| 7,853,121 B2 | 12/2010 | Yahata |
| 8,509,555 B2 | 8/2013 | Meany |
| 8,887,060 B2 | 11/2014 | Maity |
| 9,628,810 B1 | 4/2017 | Bingol |
| 2009/0125636 A1 | 5/2009 | Li |
| 2010/0070634 A1 | 3/2010 | Ranjan |
| 2010/0299701 A1 | 11/2010 | Liu |
| 2013/0080865 A1 | 3/2013 | Palm |
| 2014/0040767 A1 | 2/2014 | Bolia |
| 2014/0185950 A1 | 7/2014 | Saint Macary |
| 2015/0207904 A1 | 7/2015 | Siegman |
| 2017/0126776 A1 | 5/2017 | Bingol |
| 2017/0126842 A1 | 5/2017 | Bingol |

*Primary Examiner* — Lan-Dai T Truong
(74) *Attorney, Agent, or Firm* — Baker Botts L.L.P.

(57) ABSTRACT

Many challenges exist for supporting computing devices over a network where the computing devices are incompatible with one another. Instead of providing a native remote desktop protocol (RDP) client for each device, RDP client functionality may be provided by a cross-platform scripting language client or agent. A cross-platform scripting language client of an RDP client transcodes any received RDP-compatible packets to a format supported by a cross-platform or standards-based web browser of the RDP client.

20 Claims, 4 Drawing Sheets

REMOTE DESKTOP PROTOCOL CLIENT FOR A STANDARDS-BASED WEB BROWSER

TECHNICAL FIELD

This disclosure relates generally to providing native remote desktop protocol (RDP) client functionality, and, more particularly, to implementing RDP client functionality capable of running in a standards-based web browser that supports a cross-platform scripting language, such as JAVASCRIPT and hypertext markup language 5 (HTML5) Canvas.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

In desktop virtualization or remote working environments, a remote server provides desktop and application resources to a user. The desktop or application resources are published to a user's device utilizing a protocol, such as the remote desktop protocol (RDP). Typically, this approach requires installing a native RDP client on the user's computing device. Such approach may be costly and expensive in that multiple incompatible computing platforms must be supported. For example, costs associating with maintaining and testing native software code for each RDP client variant. The present invention seeks to avoid the need for a native RDP client on each device or information handling system in a computing environment by utilizing standards-based presentation and user interface technologies that are already present on a user's device.

SUMMARY

In one embodiment a remote desktop protocol (RDP) web client receives a packet and then sends the received packet to a cross-platform scripting language client of the RDP web client. The packet may be in an RDP compatible format. The cross-platform scripting language client may be implemented using JAVASCRIPT and JAVASCRIPT may be used to transcode the received packet. A non-blocking thread is created by the cross-platform scripting language client at the RDP web client. The cross-platform scripting language client determines a protocol data unit (PDU) type of the packet and transcodes the received packet language client based, at least in part, on the determined PDU type, wherein transcoding comprises converting the received packet to a format supported by a cross-platform web browser of the RDP client. Content from the received packet is displayed at the RDP web client via a web browser. HTML5 Canvas may be used to render the content.

In one embodiment a socket connection is established between a web-socket server and an RDP server and the RDP web client receives the packet from the RDP server via the web-socket server.

In one embodiment, one or more computer-readable non-transitory storage media embodying software that is operable when executed performs or implements any one or more embodiments. In one embodiment, an information handling system that comprises one or more processors, and a memory coupled to the processors comprising instruction executable by the processors, the processors operable when executing the instructions to perform or implement any one or more embodiments.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Implementing remote desktop protocol (RDP) functionality in a cross-platform scripting language, such as JAVASCRIPT, is efficient and reduces costs that would be associated with installing native RDP clients for all information handling systems or computing devices within a computing environment. The JAVASCRIPT RDP client implements RDP protocol and data natively in a standards-based web browser using hypertext markup language 5 (HTML5) Canvas. For example, the JAVASCRIPT RDP client transcodes audio, video and other data received in an RDP-compatible format into a format that can be natively displayed by a user's or device's web browser. The JAVASCRIPT RDP client also receives user interface events, such as mouse drags and button clicks. These events are translated into RDP packets that can be sent to the remote server.

Traditionally, RDP clients are written in a native, full-feature programming language such as C or C++. In such an environment, the native RDP client utilizes multiple threads and processes to implement the RDP protocol. A cross-platform scripting language, such as JAVASCRIPT, implements the RDP protocol by using a single, non-blocking thread that must process incoming and outgoing RDP packets and local input/output operations in real-time. A sophisticated state machine is utilized to track the RDP protocol state and match incoming RDP packets with previously received RDP packets and events.

Particular embodiments are best understood by reference to FIGS. 1-5, wherein like numbers are used to indicate like and corresponding parts.

Figure 1:
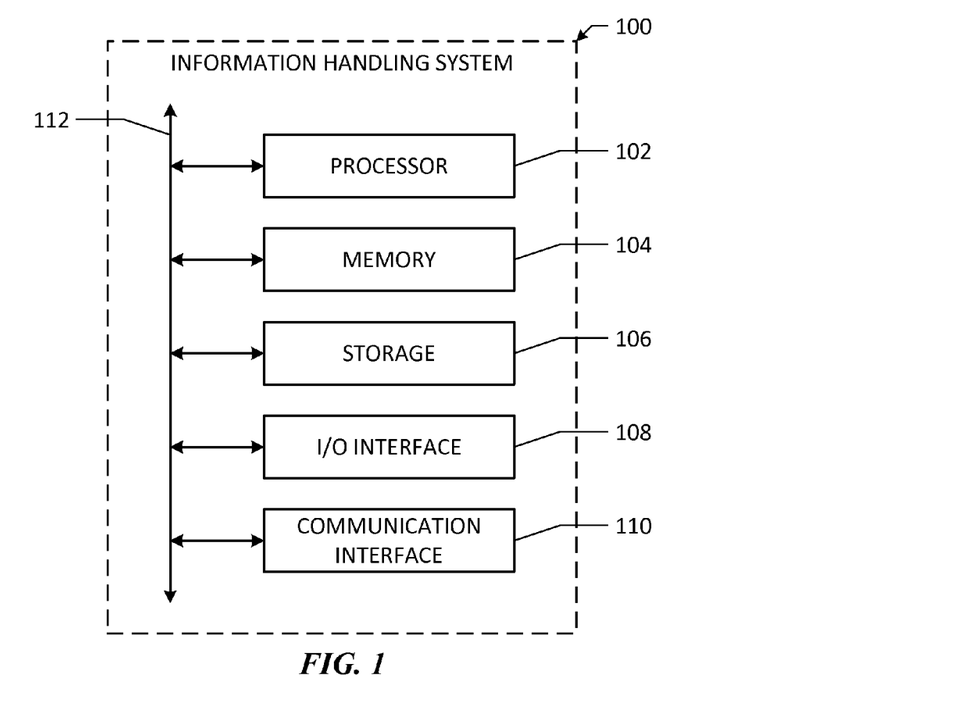
FIG. 1 is a block diagram of selected elements of an information handling system according to one or more embodiments of the present disclosure.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
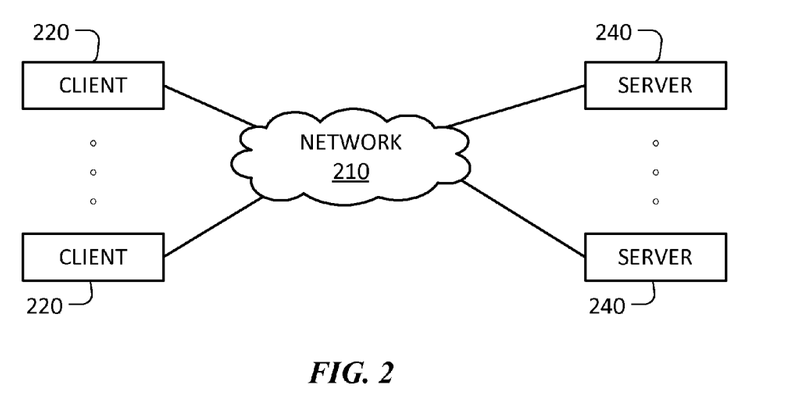
FIG. 2 is an example of a network environment according to one or more embodiments of the present disclosure.

FIG. 2 illustrates an example configuration of networked information handling systems (e.g., client devices and servers). In particular embodiments, one or more client devices 220 and one or more servers 240 are connected via network 210. Network 210 may be a public network or a private (for example, corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any other suitable information handling system. In particular embodiments, a client device 220 is an embedded computer and may have flash memory (for example, a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (e.g., Microsoft Terminal Server), a published application (for example, Microsoft Terminal Server), or any suitable information handling system. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client device 220 may access resources provided by a server 240 only after providing suitable authentication information. Alternatively, a server 240 may provide software or other resources automatically to one or more client devices 220.

It may be desirable, in the case of a private (for example, corporate) network including multiple sites or subnets to deploy software (including, for example, all or part of one or more operating systems, applications, add-ons, or data) to one or more client devices 220 across one or more sites or subnets. The client devices 220 may, for example, be located remotely from one or more servers 240 (including, for example, device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (for example, videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (for example, thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (for example, automatically) device discovery, tracking of assets (for example, hardware or software inventory) at client devices, monitoring the status or health of client devices, applying one or more policies to client devices (including, for example, network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, a client device such as client device 220 (for example, a thin client) may be designed with minimal or limited storage capacity (for example, in a hard disk). The client device 220 may be required, however, to run an operating system such as WINDOWS EMBEDDED or WINDOWS SERVER, but the footprint of such an operating system may grow over time with newer releases or updates. Hence, client devices may, over time, begin to run low on free storage space (for example, in the hard disk). Unwanted files may be deleted or full volume compression of the storage medium (for example, the hard disk) may be implemented to increase available storage space. However, full volume compression may introduce performance shortcomings (for example, increased number of instruction cycles required to compress/uncompress data in the volume) from the point of view of an end user of the client device. In particular embodiments, optimized volume compression may be implemented to reduce effective disk usage on a client device while minimizing impact on system performance.

Figure 3:
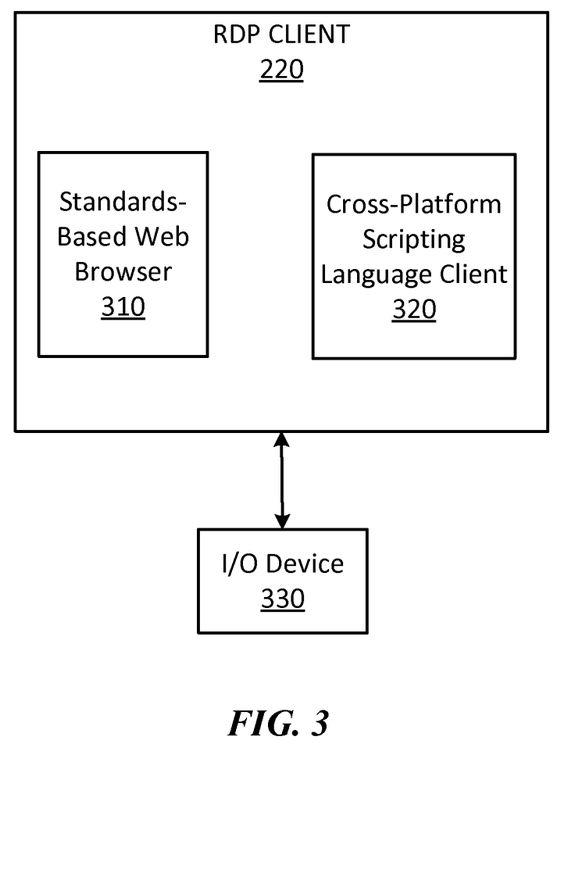
FIG. 3 is an example of a remote desktop protocol client according to one or more embodiments of the present invention.

FIG. 3 illustrates a client device 220, such as an RDP client device 220, according to one or more embodiments of the present disclosure. In one or more embodiments RDP client device 220 may comprise a standards-based web browser 310. The standards-based web browser 310 may be operable to present data via I/O interface to any one or more I/O devices 330 coupled to RDP client device 220. The one or more I/O devices 330 may be coupled directly or indirectly to RDP client device 220. I/O device 330 may be any known I/O device for presenting data to a user, such as a monitor, display, or any other graphical or textual interface known to one of ordinary skill in the art. RDP client device 220 may also comprise a cross-platform scripting language client 320. The cross-platform scripting language client 320 may be implemented using JAVASCRIPT, HTML5, any cross-platform scripting language known to one of ordinary skill in the art or any combination thereof.

In particular embodiments, as described in connection with FIG. 4, an RDP client device 220 may be implemented in a standards-based web browser 310. A web-socket server may be used to connect the RDP client device 220 implemented in a web browser to the RDP server.

Figure 4:
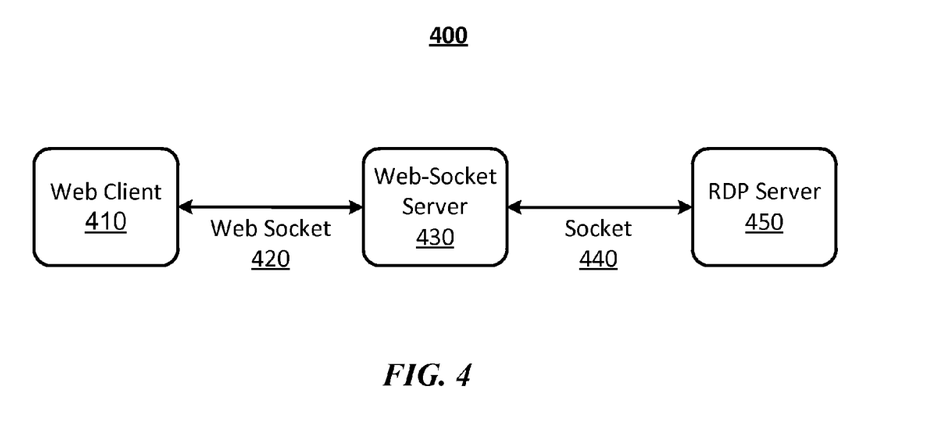
FIG. 4 is an example web socket server environment according to one or more embodiments of the present disclosure.

FIG. 4 is an example web socket server environment 400. In particular embodiments, web socket server environment 400 may include a web client 410, web socket 420, web-socket server 430, socket 440, and RDP server 450. In particular embodiments, web client 410 may correspond to RDP client device 220 and RDP server 450 may correspond to any one or any combination of RDP servers 240, described in connection with FIG. 2. Web client 410 may be a standards-based web browser 310, including an information handling system 100, such as RDP client device 220, that includes a standards-based web browser 310. Web-socket server 430 may be a proxy server, and web-socket server 430 may be implemented in C or C++ code.

Web-socket server 430 may facilitate connections between RDP server 450 and web client 410. Web client 410 may send one or more packets, for example, JAVASCRIPT packets, Protocol Data Units (PDUs), or any other suitable packets, over web socket 420. Web-socket server 430 may intercept the packets sent from web client 410 over web socket 420 and convert each packet into a socket format, which RDP server 450 may understand. Web-socket server 430 may open a socket 440 that connects with RDP server 450 and send the converted packets (e.g., in socket format) to RDP server 450 over socket 440. In particular embodiments, web-socket server 430 may intercept packets sent from RDP server 450 over socket 440, which may be in socket format. Web-socket server 430 may convert the packets into a web-socket format and send the converted packets over web socket 420 to web client 410. In this manner, web-socket server 430 may facilitate data transmissions and any other suitable communications between web client 410 and RDP server 450. The packets communicated to web client 410 may include instructions that cause web client 410 to act as an RDP client or to provide an RDP client, which may mean that the web client 410 may provide a graphical interface for presenting and interacting with a remote desktop. RDP server 450 may provide the remote desktop, which may be published to the web client 410 using an RDP via the connection facilitated by web-socket server 430.

Web-socket server 430 may receive and queue a plurality of packets (for example, PDUs) from RDP server 450, and it may be necessary to implement a flow-control functionality so that each of the received packets in the queue is sent individually, as opposed to being appended to an adjacent packet. In particular embodiments, web-socket server 430 may read and inspect each packet and extract, from the header of the packet, the length of the packet. Web-socket server 430 may then read until it reaches the extracted length of the packet and may then send the packet. For example, web-socket server 430 may receive a plurality of PDUs, which are placed into a queue, and web-socket server 430 may inspect a header of each PDU. Web-socket server 430 may determine, from the header of the first PDU, the length of the first PDU. For example, the web-socket server 430 may determine that the first PDU is 3 megabytes in length. Web-socket server 430 may then use the determined length of the first PDU to ensure that it sends only the first PDU (for example, the 3 megabytes) and does not inadvertently append any successive PDUs to the first PDU. In this manner, web-socket server 430 may implement a flow control to facilitate the transmission of one packet at a time from a queue at web-socket server 430. This flow-control functionality implemented at web-socket server 430 may make sure that the PDUs are separated, which saves resources at the web client 410, which would otherwise perform very slowly in attempting to parse the received packets.

In particular embodiments, web-socket server 430 may inspect each received packet and may determine whether the amount of processing required will require too much processing power for web-client 410 to handle effectively. Web-socket server 430 may then perform pre-processing before sending the packet to web client 410. For example, web-socket server 430 may determine that a particular packet requires run-length encoding, and web-socket server 430 may perform the run-length encoding as pre-processing before it sends the packet to web client 410. Web-socket server 430 may also handle audio pre-processing. For example, web-socket server 430 may convert packets from RDP server 450 into an audio format that is understandable to web client 410.

In particular embodiments, web-socket server 430 may implement a mirroring process, by which it may manage multiple connections between RDP server 450 and multiple different web clients 410. For example, web-socket server 430 may facilitate a connection between a main web client 410 and RDP server 450, and multiple other connections between multiple other web clients 410 and RDP server 450 may be mirrored to the main web client 410 connection (for example, view-only connections).

In particular embodiments, web-socket server 430 may create an on-demand virtual machine (for example, via AMAZON). In other words, web-socket server 430 may spawn its own RDP server 450 to which it may connect as opposed to connecting to a remote machine.

In particular embodiments, web client 410 may have a main processing loop (for example, may not be multi-threaded). Web client 410 defines any suitable number of callback functions for handling user input. As an example web client 410 may receive user input (for example, mouse or keyboard input), and web client 410 may, in response to receiving user input, send a callback function as a packet, which may be referred to herein as a callback packet, to web-socket server 430 indicating that the user input was received. Web-socket server 430 may convert the received packets to socket format and send the converted packets to RDP server 450. Web client 410 may implement worker threads. A worker thread may be a JAVASCRIPT that is capable of running independently in the background, which means that it will not interfere with the general performance of web client 410.

In particular embodiments, web-socket server 430 may utilize flags to denote particular states (for example, connection). The flags are used to track what state the system is in, because the packets do not contain that information. For example, the connection phase may include three states, authentication (for example, when credentials have been communicated and authentication is pending), capabilities (for example, when web client 410 tells RDP server 450 what features it supports and vice versa), and encryption-key exchange (for example, when second-level encryption keys are being exchanged). After the connection phase, the system may be in normal, connected stage, in which the processing loop decrypts packets and reads what kind of packet each received packet is (for example, an audio packet). Web-socket server 430 may only use flags in the connection phase stages (for example, not in the actual connection phase).

Although this disclosure describes and illustrates particular embodiments of FIG. 4 as being implemented by web-socket server 430, this disclosure contemplates any suitable embodiments of FIG. 4 occurring on any suitable interface and as being implemented by any suitable platform or system. As an example, and not by way of limitation, particular embodiments of FIG. 4 may be implemented by web client 410. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
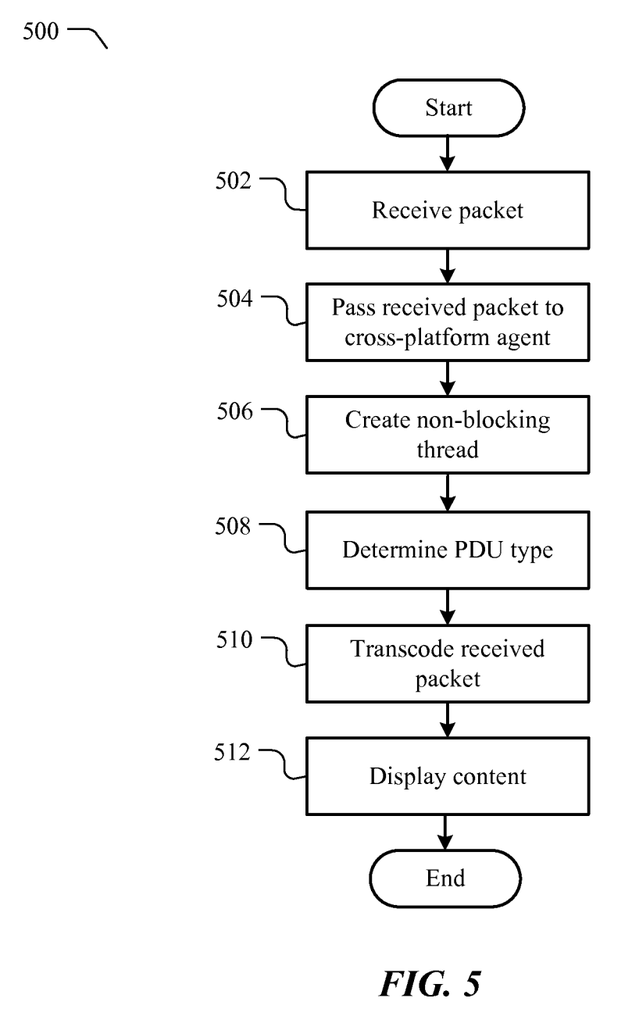
FIG. 5 is an example method for providing a remote desktop protocol (RDP) client for a standards-based web client according to one or more embodiments of the present disclosure.

FIG. 5 illustrates an example method 500 for providing a web client 410 (or RDP client device 220) for a standards-based web browser 310 where the functionality for web client 410 is implemented in a cross-platform scripting language client 320 capable of running in the standards-based web browser 310; a browser that supports a cross-platform scripting language, such as JAVASCRIPT and HTML5 Canvas. The method may begin at step 502, where web-client 410 may receive, one or more packets of data sent from an RDP server 450 via web-socket server 430. The one or more packets may be sent over a socket connection 440 established between the web-socket server 430 and the RDP server 450. The received one or more packets may be in an RDP-compatible format.

At step 504, the received one or more packets are passed or sent to the cross-platform scripting language client 320 of web client 410.

At step 506, a non-blocking thread is created by the cross-platform scripting language client 320 at the web client 410. For example, the cross-platform scripting language client 320 may be implemented using JAVASCRIPT in a standard JAVASCRIPT approach via web-worker.

At step 508, the cross-platform scripting language client 320 at the web client 410, determines the PDU type.

At step 510, the cross-platform scripting language client 320 of web client 410 transcodes based, at least in part, on the determined PDU type the received one or more packets from the RDP-compatible format to a format supported by the standards-based web browser 310 of the web client 410. In one embodiment, the cross-platform scripting language client 320 utilizes JAVASCRIPT to transcode the received packet into a format that can be natively displayed by the standards-based web browser 310 of the web client 410. The rendering is performed in HTML5 Canvas. For example, HTML5 Canvas makes resulting renderings natively consumable by a web browser 310. The received one or more packets may comprise any one or more of audio, video, data, and user interface events (such as mouse drags, button clicks, and any other user interface events known to one of ordinary skill in the art).

At step 512, any content from the transcoded received one or more packets that needs to be presented is displayed utilizing standards-based web browser 310. The content may be displayed on I/O device 330.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for providing an RDP client via a web-socket server 430, including the particular steps of the method of FIG. 5 this disclosure contemplates any suitable method for providing an RDP client via a web-socket server 430, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    receiving at a remote desktop protocol (RDP) web client a packet; sending the received packet to a cross-platform scripting language client of the RDP web client wherein the RDP web client implements an RDP protocol using the cross-platform scripting language client;
    creating a non-blocking thread by the cross-platform scripting language client at the RDP web client wherein the cross-platform scripting language client implements the RDP protocol by using a non-blocking thread to process the received packet;
    determining a protocol data unit (PDU) type by the cross-platform scripting language client;
    transcoding the received packet by the cross-platform scripting language client based, at least in part, on the determined PDU type, wherein transcoding comprises converting the received packet to a format supported by a cross-platform web browser of the RDP web client; and
    displaying content from the received packet at the RDP web client via a web browser.

2. The method of claim 1, further comprising:
    establishing a socket connection between a web-socket server and an RDP server.

3. The method of claim 2, wherein the RDP web client receives the packet from the RDP server via the web-socket server.

4. The method of claim 1, wherein the cross-platform scripting language client is implemented using JAVASCRIPT.

5. The method of claim 1, wherein the cross-platform scripting language client uses JAVASCRIPT to transcode the received packet.

6. The method of claim 1, wherein HTML5 Canvas is used to render the content.

7. The method of claim 1, wherein the received packet is in an RDP compatible format.

8. One or more computer-readable non-transitory storage media embodying software that is operable when executed to:
    receive at a remote desktop protocol (RDP) web client a packet;
    send the received packet to a cross-platform scripting language client of the RDP web client wherein the RDP web client implements an RDP protocol using the cross-platform scripting language client;
    create a non-blocking thread by the cross-platform scripting language client at the RDP web client wherein the cross-platform scripting language client implements the RDP protocol by using a non-blocking thread to process the received packet;
    determine a protocol data unit (PDU) type by the cross-platform scripting language client;
    transcode the received packet by the cross-platform scripting language client based, at least in part, on the determined PDU type, wherein transcoding comprises converting the received packet to a format supported by a cross-platform web browser of the RDP web client; and
    display content from the received packet at the RDP web client via a web browser.

9. The media of claim 8, wherein the software is further operable when executed to:
    establish a socket connection between a web-socket server and an RDP server.

10. The media of claim 9, wherein the RDP web client receives the packet from the RDP server via the web-socket server.

11. The media of claim 8, wherein the cross-platform scripting language client is implemented using JAVASCRIPT.

12. The media of claim 8, wherein the cross-platform scripting language client uses JAVASCRIPT to transcode the received packet.

13. The media of claim 8, wherein HTML5 Canvas is used to render the content.

14. An information handling system comprising:
    one or more processors; and
    a memory coupled to the processors comprising instructions executable by the processors, the processors operable when executing the instructions to:
        receive at a remote desktop protocol (RDP) web client a packet; send the received packet to a cross-platform scripting language client of the RDP web client wherein the RDP web client implements an RDP protocol using the cross-platform scripting language client;

create a non-blocking thread by the cross-platform scripting language client at the RDP web client wherein the cross-platform scripting language client implements the RDP protocol by using a non-blocking thread to process the received packet;

determine a protocol data unit (PDU) type by the cross-platform scripting language client;

transcode the received packet by the cross-platform scripting language client based, at least in part, on the determined PDU type, wherein transcoding comprises converting the received packet to a format supported by a cross-platform web browser of the RDP web client; and display content from the received packet at the RDP web client via a web browser.

15. The information handling system of claim 14, wherein the processors are further operable when executing the instructions to:

establish a socket connection between a web-socket server and an RDP server.

16. The information handling system of claim 15, wherein the RDP web client receives the packet from the RDP server via the web-socket server.

17. The information handling system of claim 14, wherein the cross-platform scripting language client is implemented using JAVASCRIPT.

18. The information handling system of claim 14, wherein the cross-platform scripting language client uses JAVASCRIPT to transcode the received packet.

19. The information handling system of claim 14, wherein HTML5 Canvas is used to render the content.

20. The information handling system of claim 14, wherein the received packet is in an RDP compatible format.

* * * * *